US008542418B2

(12) United States Patent
Chandu et al.

(10) Patent No.: US 8,542,418 B2
(45) Date of Patent: Sep. 24, 2013

(54) PRINTER CALIBRATION FOR PRINTERS WITH FIXED PRINT ARRAY STRUCTURES

(75) Inventors: Kartheek Chandu, Longmont, CO (US); Larry M. Ernst, Longmont, CO (US); Sreenath R. Vantaram, Rochester, NY (US); Mikel J. Stanich, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 418 days.

(21) Appl. No.: 12/868,311

(22) Filed: Aug. 25, 2010

(65) Prior Publication Data

US 2012/0050755 A1 Mar. 1, 2012

(51) Int. Cl.
*H04N 1/46* (2006.01)
(52) U.S. Cl.
USPC ............ 358/504; 358/1.9; 358/518; 358/534; 358/3.06; 358/3.26; 358/3.27; 358/406; 347/6; 347/10; 347/11; 347/12; 347/14; 347/15; 347/16; 347/19; 347/23

(58) Field of Classification Search
None
See application file for complete search history.

(56) References Cited

U.S. PATENT DOCUMENTS

| 5,767,987 | A | * | 6/1998 | Wolff et al. ............ 358/447 |
| 5,943,477 | A | | 8/1999 | Rao et al. |
| 6,027,201 | A | * | 2/2000 | Edge ..................... 347/19 |
| 6,102,513 | A | | 8/2000 | Wen |
| 6,441,923 | B1 | | 8/2002 | Balasubramanian et al. |
| 6,606,168 | B1 | * | 8/2003 | Rylander ............... 358/3.09 |
| 7,118,188 | B2 | | 10/2006 | Vilanova et al. |
| 7,277,196 | B2 | | 10/2007 | Van de Capelle et al. |
| 7,411,700 | B2 | | 8/2008 | Johnson |
| 7,489,422 | B2 | | 2/2009 | Zuber |
| 8,089,668 | B2 | * | 1/2012 | Klassen ................. 358/504 |
| 8,189,244 | B2 | * | 5/2012 | Fukuhara ............... 358/518 |

(Continued)

FOREIGN PATENT DOCUMENTS

EP 0461810 A2 12/1991

OTHER PUBLICATIONS

Emmel: "Towards a Color Prediction Model for Printed Patches", IEEE Computer Graphics and Applications, IEEE Service Center, New York, NY, US, vol. 19, No. 4, Jul. 1, 1999, pp. 54-60, XP000927831, ISSN: 0272-1716, DOI 10.1109/38.773964.

(Continued)

*Primary Examiner* — Miya J Cato
(74) *Attorney, Agent, or Firm* — Duft Bornsen & Fettig, LLP

(57) ABSTRACT

The systems and methods presented herein provide for calibrating a print engine of a printing system. The printing system prints image data on a print medium and scans the printed image data. Color values of the scanned image data are then measured and various tints of color values and their transition locations are identified. A calibration module estimates the original optical densities of the identified color value tints and generates a target optical density for each of the identified color value tints using the estimated original optical densities to determine print irregularities in the color values of the scanned image data. The calibration module then generates a halftone screen based on the mean optical densities and applies the generated halftone screen to the print engine to calibrate the print engine.

19 Claims, 9 Drawing Sheets

(56) References Cited

U.S. PATENT DOCUMENTS

| | | | |
|---|---|---|---|
| 8,253,975 B2* | 8/2012 | Bai | 358/1.9 |
| 2003/0071866 A1 | 4/2003 | Wong et al. | |
| 2006/0077489 A1* | 4/2006 | Zhang et al. | 358/504 |
| 2009/0195581 A1 | 8/2009 | Bastani et al. | |
| 2010/0045722 A1 | 2/2010 | Chandu et al. | |
| 2011/0043864 A1* | 2/2011 | Tian et al. | 358/3.26 |

OTHER PUBLICATIONS

Hersch et al.: "Improving the Yule-Nielsen modified Spectral Neugebauer mode by dot surface coverages depending on the ink superposition conditions", Proceedings of the SPIE, The International Society for Optical Engineering SPIE, USA, vol. 5667, Jan. 17, 2005, pp. 434-447, XP002578207, ISSN 0277-786X, DOI: 10.117/12.588907.

* cited by examiner

PRINTER CALIBRATION FOR PRINTERS WITH FIXED PRINT ARRAY STRUCTURES

CROSS-REFERENCED RELATED APPLICATIONS

This patent application is related to commonly owned and co-pending U.S. patent application Ser. No. 12/640,692, the contents of which are incorporated by reference.

FIELD OF THE INVENTION

The invention relates to the field of calibrating printing systems.

BACKGROUND

Production printing systems often comprise multiple printheads to increase speed and/or improve print quality. For example, inkjet printheads, electrophotographic toner printheads, wax printheads, etc., have inherent technological limits pertaining to the volume of colorant (e.g., ink, toner, etc.) dispersed over time. Thus multiple printheads may be employed to quickly generate a particular image and/or apply a large volume of colorant over a given period of time to improve print quality (i.e., image optical density).

To meet the demand for producing relatively high quality images, printers are designed with a number of printheads in a fixed array arrangement, wherein only the media is in motion. This is a technique commonly used in high speed production inkjet printers. However, due to the technical limitations, the design of fast operating printheads is difficult to accomplish. An alternate way of producing high color image quality is to increase the number of printheads and print an image multiple times on the media at same location. This mode of printing is usually referred as "multiple pass" printing. Analogously, printing with a single printhead is referred to as "single pass" printing. As a consequence of multipass printing, integrating twice the number of printheads, subsequently results in an image being printed at double the speed.

A specific type of "dual-pass printing" design uses two channels to print the same data twice on a media with relatively fast motion. These two passes use a different set of screens/halftones to print. Furthermore, this design also allows for a controllable switching mechanism between single pass printing and dual-pass printing. The screens/halftones for single pass printing are usually calibrated to produce 256 distinct output "gray" levels on the media. However, when two single passes print an image twice with the aforementioned calibrated screens/halftones, the resultant output does not produce the desired set of 256 distinct gray scale levels. In addition, the gray levels pertaining to shadow tone regions may be saturated with colorant and at the point in the tone range where saturation occurs, the solid area density ceases to increase. Moreover, print irregularities and artifacts may be caused by variations in fixed print-head array arrangements due to print-head overlaps and physical variations between print-heads. Calibration is therefore employed to produce 256 distinct gray scale levels when printing using a dual-pass mechanism.

Calibration of printing systems, particularly production printing systems, often includes a significant amount of manual intervention and time to achieve desired results. Additionally, any calibration process designed to compensate print non-uniformities is often dependent on the accurate detection of non-uniformities. Thus, if the detection protocol of a calibration process is inaccurate, then the entire calibration process is generally inaccurate. Consequently, there is a need for an automated calibration procedure involving compensation of print non-uniformities and artifacts to relatively satisfactory levels where the Human Visual System (HVS) perceives the printed output as uniform.

SUMMARY

Embodiments herein provide for the accurate detection, perceptual characterization, and compensation of print non-uniformities/artifacts associated with print array structures (e.g., fixed print head arrays). Generally, the systems and methods provide a generic (CMYK) machine, ink, and paper independent solution that compensate print non-uniformities and artifacts resulting from variations in fixed print-head array arrangements. The systems and methods reduce the effects of these print irregularities by creating a halftone mask, for each color plane, across the media (e.g. a "paper web"). In one embodiment, an initial stochastic halftone screen is generated using a standard halftoning methodology. Following this, the halftone screen is stored in the printing system and is modified to account for any print irregularities.

In one embodiment, a method provides for calibrating a print engine of a printing system, by printing image data on a print medium, scanning the printed data, and measuring color values of the scanned data to identify different tint levels corresponding to various colors. The method also includes estimating original optical densities of the identified tints, computing the mean optical density values for each of the identified tints using an estimate/approximation of the original optical densities, to determine print irregularities in the tint (or color) values of the scanned image data, and eventually generating a halftone screen based on the mean optical densities. The measurements and halftone are generated to compensate for each nozzle. The method also includes applying the generated halftone screen to the print engine to calibrate the print engine. The method may also include applying an initial stochastic halftone screen to the print engine prior to printing the image data on the print medium The method may further include determining a perceptual/mathematical model of characterizing various print irregularities in the color values, reprinting the image data on the print medium using the generated/calibrated halftone screen, scanning the reprinted image data, and using the perceptual/mathematical characterization procedure to validate the generated halftone screen and, in doing so, inherently checking whether print irregularities have been compensated to satisfactory tolerance levels.

Determining the perceptual model of the determined print irregularities in the color values may include converting the scanned image data to the SCIEL*a*b* (Spatial CIELab) color space, determining a mean L*a*b* value of each tint of each color value, comparing the mean L*a*b* value of each tint of each color value to the color converted scanned image data (i.e., in the SCIEL*a*b* color space) to determine color value differences, and characterizing the color value irregularities based on the determined color difference.

Estimating original optical densities of the identified tints of the color values may include generating a point spread function of the system using the scanned image data to characterize the effect of the printing/scanner system on the printed target, determining optical densities of the identified tints for various colors, and deconvolving the computed optical densities of the identified tints for various colors with the aforementioned point spread function to generate estimates of the original optical densities of the identified tints, at the input side of the printing system on a per nozzle basis.

Generating the mean optical density for each of the identified tints for various color values may include summing the estimated original optical density of each identified tint and dividing each summed tint by a number of pixels in that tint (i.e., along the direction of motion of the media) to generate the mean optical density for each of the identified tints. Generating a halftone screen based on the mean optical densities may include compensating the mean optical densities of the identified tints with calibrated mean optical densities of the identified tints using a non linear mapping.

The various embodiments disclosed herein may be implemented in a variety of ways as a matter of design choice. The embodiments may take the form of hardware, software, firmware, or combinations thereof. For example, a calibration module may be configured as a software module within a print controller of the printing system to operate in the manner described above. In another embodiment, a computer readable medium is operable to store software instructions for calibrating a high-speed production printing system to a plurality of different paper types. These software instructions are configured so as to direct the printing system to operate in the manner described above.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
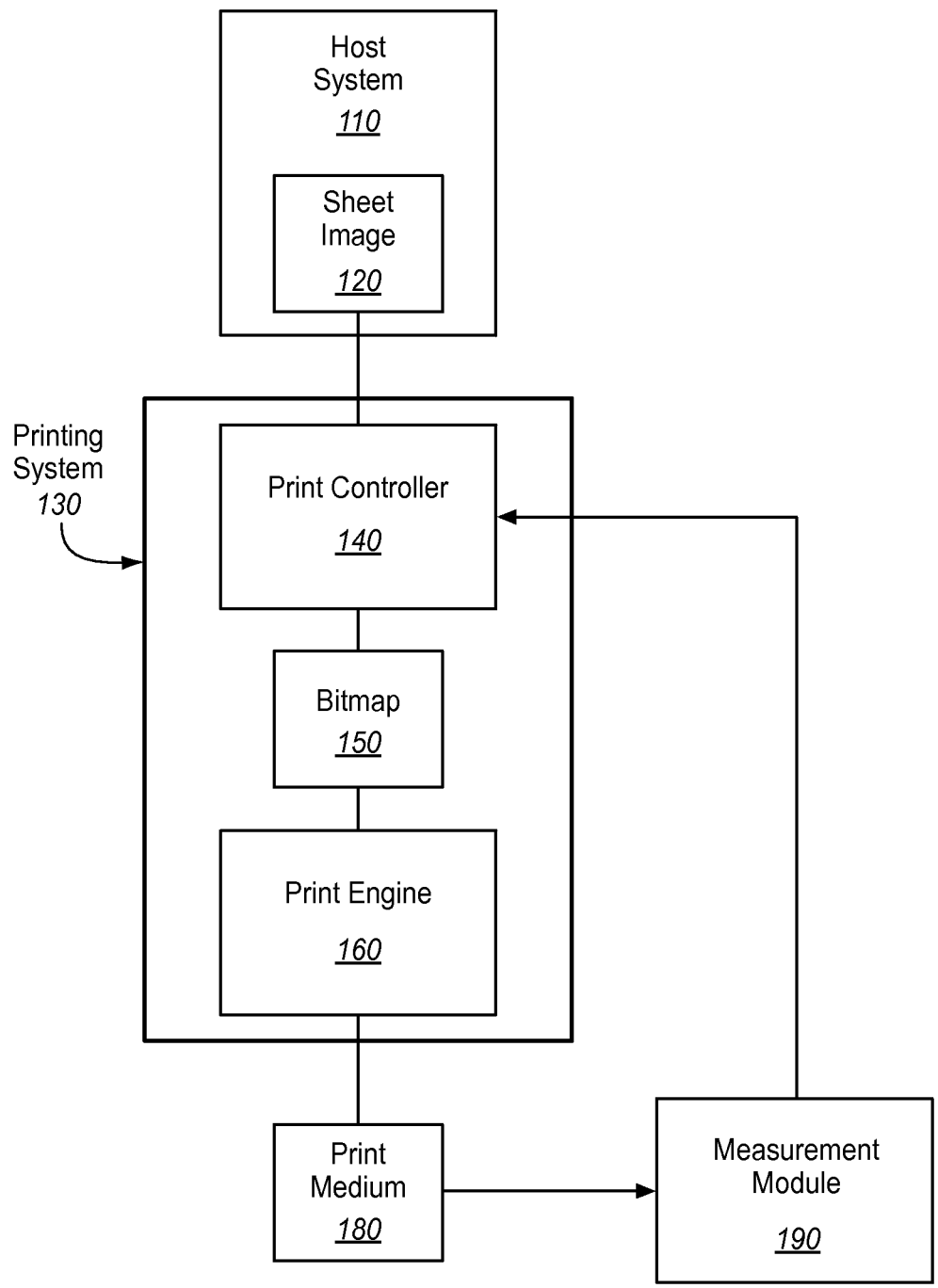
FIG. 1 is a block diagram illustrating a printing system in an exemplary embodiment.

FIG. 1 is a block diagram illustrating a printing system 130 in an exemplary embodiment. A host system 110 communicates with a printing system 130 to print a sheet image 120 onto a print medium 180 (e.g., paper) via a print engine 160. The print engine 160 includes a fixed print array structure (e.g., inkjet printheads). The sheet image 120 may be printed in color (e.g., Cyan, Magenta, Yellow, and blacK, or "CMYK") and/or in any number of gray shades, including black and white. The host system 110 may comprise any computing device, such as a personal computer, a server, or even a digital imaging device, such as a digital camera or a scanner. The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the print engine 160 (e.g., using ink, toner, or the like). The printing system 130 may be a high-speed printer operable to print relatively high volumes (e.g., greater than 100 pages per minute). The print medium 180 may be continuous form paper, cut sheet paper, and/or any other tangible medium suitable for printing.

Figure 2:
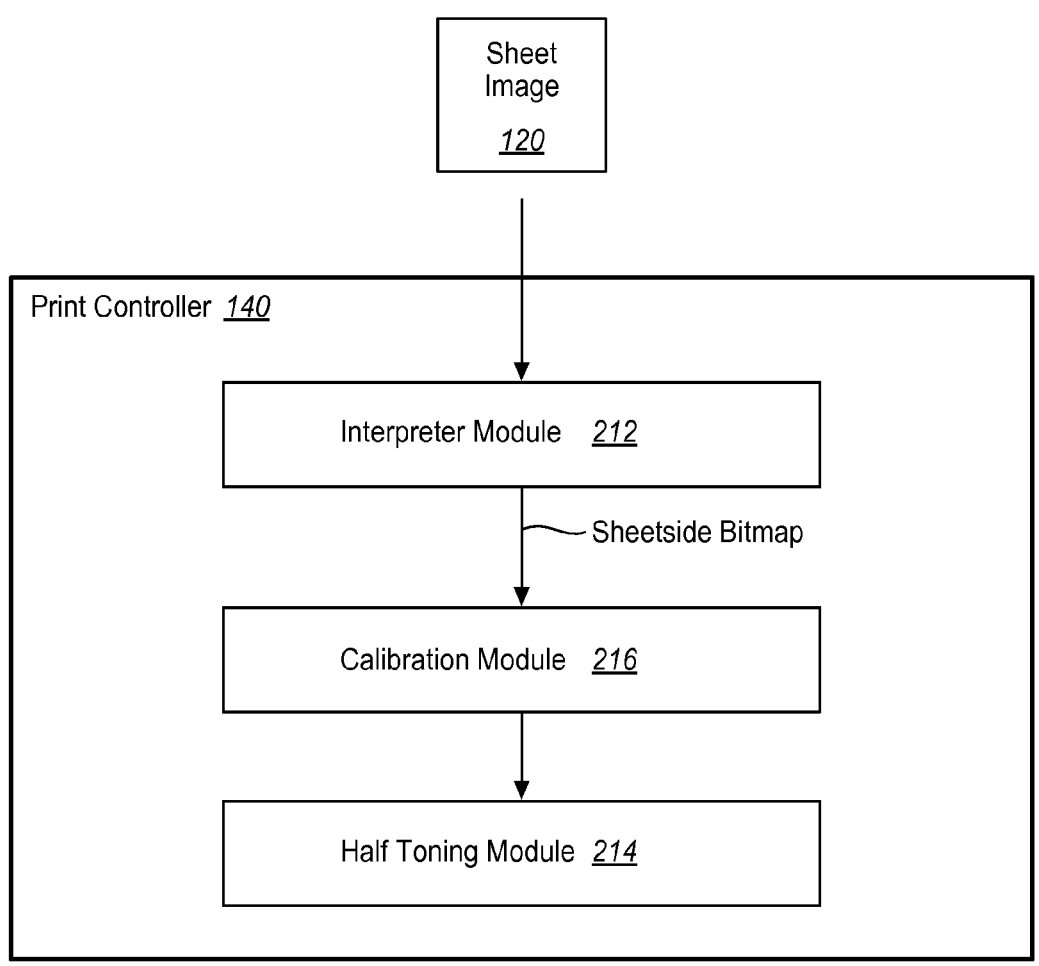
FIG. 2 is a block diagram illustrating a print controller in an exemplary embodiment.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. FIG. 2 is a block diagram illustrating an exemplary print controller 140. The print controller 140, in its generalized form, includes an interpreter module 212, a halftoning module 214, and a calibration module 216. These separate components may represent hardware used to implement the print controller 140. Alternatively or additionally, the separate components may represent logical blocks implemented by executing software instructions in a processor of the printer controller 140. Accordingly, the invention is not intended to be limited to any particular implementation as such may be a matter of design choice.

The interpreter module 212 is operable so as to interpret, render, rasterize, or otherwise convert images (i.e., raw sheet-side images such as sheet image 120) of a print job into sheetside bitmaps. These sheetside bitmaps generated by the interpreter module 212 are each a 2-dimensional array of pixels representing an image of the print job (i.e., a Continuous Tone Image), also referred to as full sheetside bitmaps. The 2-dimensional pixel arrays are considered "full" sheet-side bitmaps because the bitmaps include the entire set of pixels for the image. The interpreter module 212 is operable so as to interpret or render multiple raw sheetsides concurrently so that the rate of rendering substantially matches the rate of imaging of the production print engines.

The halftoning module 214 is operable to represent the sheetside bitmaps as halftone patterns. For example, the halftoning module 214 may convert the pixels to halftone patterns or "screens" of CMYK toner or ink for application to the paper. Once the halftones screens are generated, the halftoning module 214 transfers the converted sheetside bitmaps to the print engine 160 to apply the ink/toner to the paper. The print controller 140 may further include other modules such as a print job storage system, a raw data preprocessing system, and a bitmap processing system, etc.

The calibration module 216 comprises hardware, software, firmware, or any combination thereof, that is operable to calibrate the printing system 130 for printing. To assist in the calibration, a measurement module 190 may be used to detect colors printed on the print medium 180. For example, the measurement module 190 may be an optical densitometer or a spectrophotometer that measures colors on the print medium 180 for use in calibrating the printing system 130 to the print medium 180.

Figure 3:
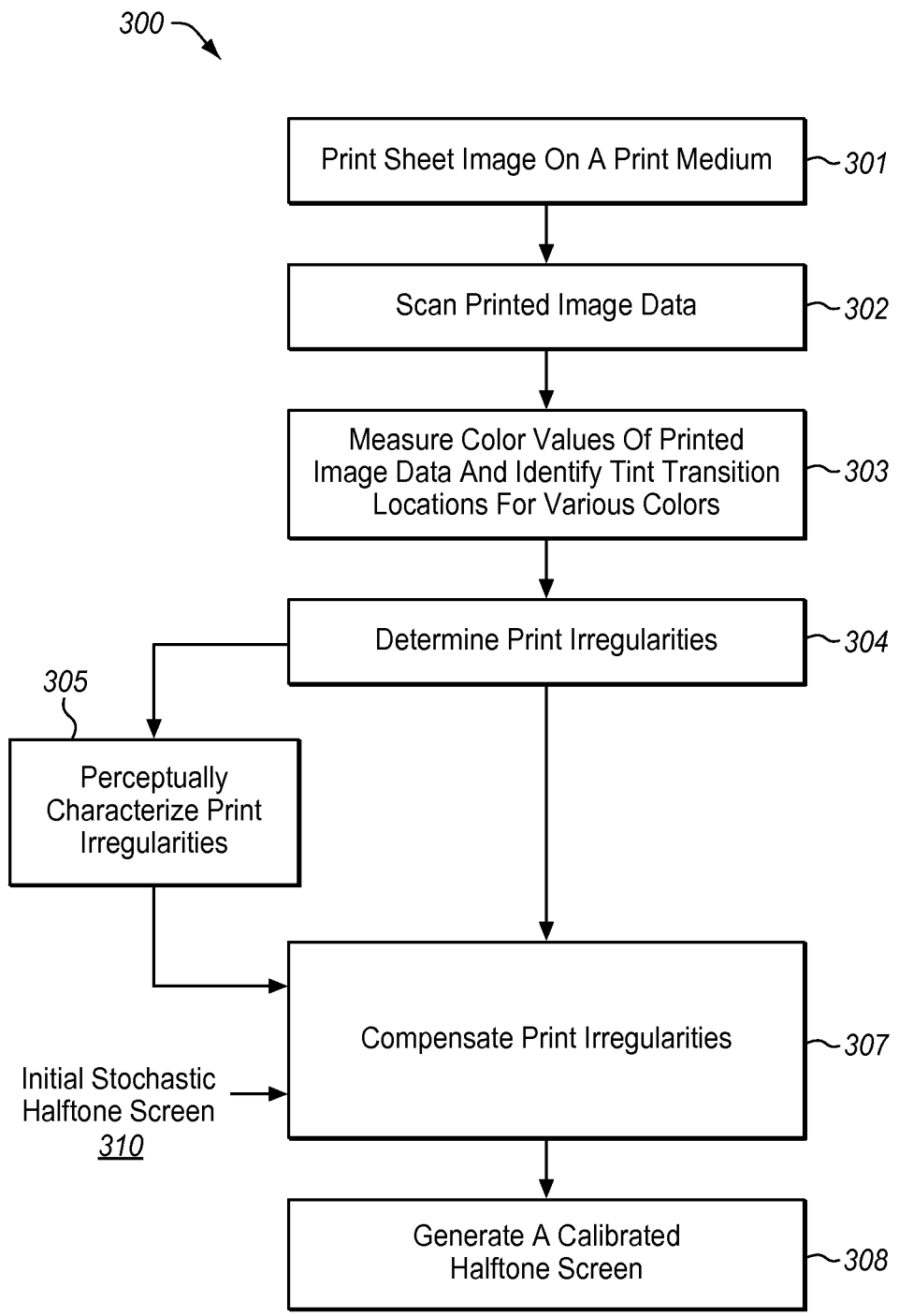
FIG. 3 is a flow chart illustrating a process of printer calibration in an exemplary embodiment.

FIG. 3 is a flow chart illustrating one exemplary process 300 for calibrating the printing system 130. The process begins with the printing system 130 printing the sheet image 120 onto the print medium 180, in the process element 301. For example, the print controller 140 receives the sheet image 120 and interprets or otherwise renders the sheet image via the interpreter module 212. The halftoning module 214 may then use a stored initial stochastic halftone screen 310 to generate the bitmap 150 for presentation to the print engine 160 such that the print engine 160 may print the bitmap 150 onto the print medium 180. As mentioned, the initial stochastic halftone screen 310 is generated using a standard halftoning methodology and is stored in the printing system 130.

The calibration module 216 is operable to adjust the initial stochastic halftone screen 310 to calibrate the print engine 160. In doing so, the measurement module 190 may measure color values of the printed image data on the print medium 180. For example, the measurement module 190 may be operable to scan the print medium 180, in the process element 302, and measure color values of the printed image data and identify tints and their transition locations/indices from the scanned image, in the process element 303 (e.g., via an optical densitometer). The calibration module 216 may use the identified tints such that the non-uniformity in the printed and scanned color values may be subsequently compensated. Once the printed image data is scanned and the color values of the image data are measured, the calibration module 216 determines print irregularities associated with the print array structure, in the process element 304. For example, the calibration module 216 may characterize the printing system 130 to estimate the original optical densities of the image data.

The calibration module 216 may then, in the process element 307, analyze the print irregularities to adjust the initial stochastic halftone screen 310 and compensate the print irregularities. For example, the calibration module 216 may retrieve the initial stochastic halftone screen 310 from storage and then generate a calibrated halftone screen, in the process element 308, and calibrate printing. That is, the new halftone screen provides the calibration for the printing system 130 such that the image data may be subsequently printed such as all non-uniformities are less than desired tolerances.

To validate the generated halftones screens, the calibration module 216 may also perceptually characterize the print irregularities, in the process element 305. For example, the calibration module 216 may generate a perceptual model of the scanned image data that includes the determined print irregularities from the process element 304. The calibration module 216 may then analyze these print irregularities to generate a model as to how they may be observed by the HVS. The image data may then be reprinted on the print medium using the newly calibrated halftones screen which subsequently may be scanned and the color values of the reprinted image data are measured. The calibration module 216 may then utilize the perceptual model on the scanned reprinted image data to validate the generated halftone screen. If the generated halftone screen does not produce the desired image quality, the information from the perceptual model generated in the process element 305 may be used to further compensate the print irregularities, in the process element 307.

Figure 4:
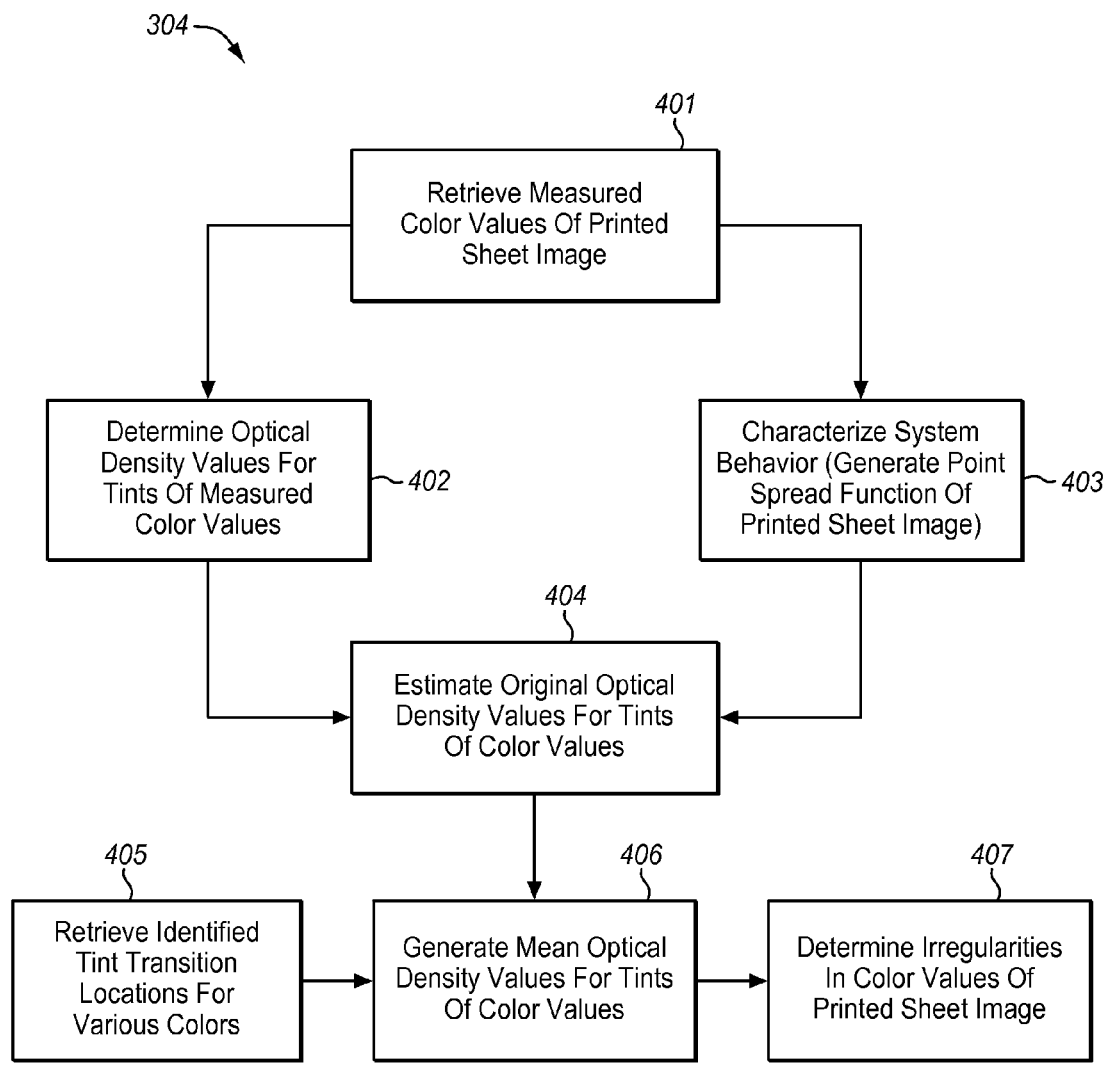
FIG. 4 is a flow chart illustrating one exemplary process of determining the print irregularities for use in calibrating the printing system.

FIG. 4 is a flow chart illustrating one exemplary process 304 of determining the print irregularities for use in calibrating the printing system 130. In this embodiment, the calibration module 216 may retrieve the measured color values of the printed sheet image 120 in the process element 401 obtained during the previous process element 303. From there, the calibration module 216 estimates original optical density values for the color values in the image data, in the process element 404. To do so, the calibration module 216 characterizes the behavior of the printing system 130, print medium 180 and measurement module (e.g., scanner) 190 behavior by determining its Point Spread Function (PSF) using the printed and scanned image data, in the process element 403. For example, the calibration module 216 may perform a system level characterization of the printing system 130, print medium 180 and measurement module (e.g., a scanner) 190, based on its PSF. The PSF generally provides the overall behavior of the printing system 130 (i.e., assuming it is a linear and shift invariant process) and its blurring effect while printing the image data on the print medium 180 and subsequently scanning it via the measurement module 190. To this effect, PSF also makes the calibration substantially system, ink, and paper independent. The PSF of an optical system is the image of a single point object formed at the image plane and the degree of spreading/blurring of this point at the image plane, which may be used as a measure for quantifying the overall quality of an optical system. Analogously, the PSF of the components 130, 180 and 190 considers the scanned image of a single point object and the degree of/blurring of that point at the image plane. The PSF provides a measure for the quality of the printing system 130, print medium 180, and the scanner 190 (i.e., assuming it is a linear and shift invariant process). Given an input f(x,y) to the printing system 130 and its PSF h(x,y), the output g(x,y) of the scanner in the measurement module 190 can be mathematically computed as a two dimensional (2-D) convolution of the input f(x,y) with the PSF h(x,y), defined as:

$$g(x,y)=f(x,y)*h(x,y)=\int_{-\infty}^{+\infty}\int_{-\infty}^{+\infty}f(\alpha,\beta)h(x-\alpha,y-\beta)d\alpha d\beta,$$

Equation 1 where $\alpha$ and $\beta$ represent spatial shifts of h(x,y) along the two (horizontal and vertical) spatial dimensions. To determine the PSF h(x,y), the input to the imaging system is taken as $f(x,y)=\delta(x,y)$ (i.e., the point source in Equation 1), which yields:

Equation 2

$$\begin{aligned}g(x,y) &= f(x,y)*h(x,y)\\ &= \int_{-\infty}^{+\infty}\int_{-\infty}^{+\infty}\delta(\alpha,\beta)h(x-\alpha,y-\beta)d\alpha d\beta\\ &= \int_{-\infty}^{+\infty}\int_{-\infty}^{+\infty}\delta(\alpha-0,\beta-0)h(x-\alpha,y-\beta)d\alpha d\beta\\ &= h(x,y) \rightarrow PSF \text{ (from the SIFT property)}\end{aligned}$$

The PSF of an optical/imaging system can also be determined by computing a Line Spread Function (LSF) derived from a line target at different orientations. The LSF at a specific direction/orientation is the one dimensional (1-D) projection of the 2-D PSF along that orientation/direction. If the PSF of the imaging system is assumed to be circularly symmetric, then the LSF at single orientation is sufficient to derive the 2-D PSF. Conversely, if the PSF is not circularly symmetric, then the LSF at various orientations is derived and subsequently back-projected to reconstruct the 2-D PSF. Thus, when $f(x,y)=1(x)\delta(y)$ (i.e., line target in Equation 1 at zero degree orientation) we have, Equation 3

$$\begin{aligned}g(x,y) &= 1(x)\delta(y)*h(x,y) \quad (3)\\ &= \int_{-\infty}^{+\infty}\int_{-\infty}^{+\infty}1(\alpha)\delta(\beta)h(x-\alpha,y-\beta)d\alpha d\beta\\ &= \int_{-\infty}^{+\infty}1(\alpha)h(x-\alpha)d\alpha\int_{-\infty}^{+\infty}1(\beta)h(y-\beta)d\beta\\ &= \int_{-\infty}^{+\infty}h(\alpha,y)d\alpha \rightarrow LSF \text{ (Projection of a 2-DPSF)},\end{aligned}$$

Experimentally, the obtained LSF (i.e., the LSF practical) derived from the line target being subjected to the components 130, 180 and 190 is Gaussian. Consequently, the obtained LSF may be mathematically modeled using a generalized equation of a Gaussian described below in Equation 4.

Equation 4

$$G(x) = Ae^{-\frac{(x-\mu)^2}{2\sigma^2}} + O,$$

where A is the amplitude of the Gaussian, $\mu$ is the mean location value of the Gaussian, $\sigma$ is one standard deviation away from the mean location of the Gaussian, and O is the offset value of the Gaussian.

Mathematical modeling was done such that the theoretical estimates of A, $\mu$, $\sigma$ and O represented as $A_t$, $\mu_t$, $\sigma_t$ and $O_t$, respectively are obtained from the theoretical Gaussian curve that best fits the practical LSF in the least squares sense, as represented in Equation 5.

Equation 5

$$S(A_t \mu_t \sigma_t O_t) = \left\{ \sum_{i=1}^{n} (LSFpractical_i^r - G(x_i))^2 \right\},$$

$$S(\hat{A}_t, \hat{\mu}_t, \hat{\sigma}_t, \hat{O}_t) = \min\left\{ \sum_{i=1}^{n} (LSFpractical_i - G(x_i))^2 \right\}$$

In Equation 5, $S(A_t, \mu_t, \sigma_t, O_t)$ represents the theoretical parametric set obtained such that the cumulative squared error incurred from all 'n' samples of the practical LSF and its corresponding Gaussian fit (G), is minimum.

Following this, multiple line targets at different locations on the print medium may be subjected to the same procedure and the mean parametric values $\hat{A}$, $\hat{\mu}$, $\hat{\sigma}$, and $\hat{O}$ across all line targets are obtained. Finally the mean theoretical LSF curve is obtained as:

Equation 6

$$LSFtheoretical = \hat{A}e^{-\frac{(x-\hat{\mu})^2}{2\hat{\sigma}^2}} + \hat{O}.$$

Now, it is assumed that the PSF is circularly symmetric such that the above calculated mean 1-D theoretical LSF may be used to compute the entire 2-D PSF (i.e., that possesses the shape of a 2-D Gaussian function). The width of the LSF=$4\hat{\sigma}$ → the width of 2-D PSF=$4\hat{\sigma} \times 4\hat{\sigma}$, assuming circular symmetry.

It should be noted that such is the case where the "effects" of the printing system 130 on the print medium 180 are not perfectly linear, the PSF obtained in the aforementioned procedure serves as a close approximation to the blurring predominantly caused by the measurement module 190. This is especially true in cases where there is significant blurring from the scanner.

The calibration module 216 also determines optical density values of the tints of the measured color values, in the process element 402. Traditional calculations of optical density yielded satisfactory density variations for Cyan (C), Magenta (M), and blacK (K). However, optical density variations for Y were relatively "noisy" and reproduced undesirable results. To overcome this problem, opponent color component substitutions based on optical density calculations is incorporated, in a manner similar to the methodology of computing dot gain based on opponent color substitutions using the Murray-Davis equation. This modified optical density calculation improves sensitivity to density variations for Yellow, while maintaining relatively good detection of the variations for Cyan, Magenta and Black. Thus the computation of optical density using opponent color component substitutions provides an efficient color generic solution to calibration. Other calibration metrics, such as the perceptual scale of nonlinear brightness (L*) or reflectance may also be employed. The X, Y, and Z values which are used for the optical density calculations are derived from the device R,G,B values produced by the measurement module 190 (e.g., a scanner).

The optical density calculations generally provide a measure of the degree of darkness of a photographic or a reflecting surface. More specifically, the optical density calculations provide a measure of how dark a printed image is relative to paper. Traditionally, optical density (OD) may be computed as follows:

Equation 7

$$OD = log_{10}\left(\frac{100}{Y}\right),$$

where Y is known as Luminance or Brightness of a color.

Equation 8

$$OD = log_{10}\left(\frac{L*+0.16}{1.16}\right)^3$$

where L* is known as Lightness of a color.

However to provide a color generic calibration process by improving the sensitivity to density variations for all colors, the calibration module 216 performs opponent color component substitution and then computes the optical densities, mathematically represented in Equations 9-14. In this example sRGB is assumed to convert RGB values to CIE XYZ values.

Equations 9-14

$$X = 0.4124R + 0.3576G + 0.1805B$$

$$Y = 0.2126R + 0.7152G + 0.07222B$$

$$Z = 0.0193R + 0.1192G + 0.9505B$$

$$OD = log_{10}\left(\frac{100}{X}\right), \text{ for Cyan}$$

$$OD = log_{10}\left(\frac{100}{Y}\right), \text{ for Magenta and Black}$$

$$OD = log_{10}\left(\frac{100}{Z}\right), \text{ for Yellow.}$$

The above process is similar to the Murray Davis Equations for dot gain wherein dot gain is computed using opponent color component substitutions.

The calibration module 216 may estimate the original optical density values for those tints, in the process element 404 by modeling the output g(x,y) of the measurement module (e.g., a scanner) 190, as a 2-D convolution of the input f(x,y) to the printing system 130, with the PSF h(x,y) as follows g(x,y)=f(x,y)*h(x,y). In general, typical imaging/optical systems like the printing system 130 or the measurement module 190 have an effect of "blurring" the input f(x,y) at the image plane. Deconvolution solves the inverse problem of estimating the original input f(x,y) at the object plane, given the PSF h(x,y) of the imaging and the output g(x,y) at the image plane. Blind deconvolution permits recovery of the input f(x,y) from a single or set of "blurred" output images in the presence of a poorly determined/unknown PSF. More specifically, deconvolution is defined as the convolution of the output g(x,y) of the imaging system at the image plane with the inverse (or pseudo inverse) if the PSF h(x,y) of the imaging system to arrive at is the estimate of the input f(x,y) at the object plane. Such is mathematically represented as:

Equation 15

$$\hat{f}(x, y) = g(x, y) * \frac{1}{h(x, y)}$$

Equation 15 is a spatial domain representation of deconvolution. Equation 16 shows a frequency domain representation of deconvolution.

Equation 16

$$\hat{F}(\xi, \eta) = \left\{\frac{G(\xi, \eta)}{H(\xi, \eta)}\right\} \Rightarrow \hat{f}(x, y) = \mathfrak{I}^{-1}\{\hat{F}(\xi, \eta)\} \text{-->} \quad (16)$$

$$\hat{F}(\xi, \eta) = \mathfrak{I}^{-1}\left\{\frac{G(\xi, \eta)}{H(\xi, \eta)}\right\}.$$

Here, $G(\zeta,\eta)$ and $H(\zeta,\eta)$ are the frequency domain representations of g(x,y) and h(x,y) respectively, computed using the 2-D Fourier Transform.

Following deconvolution, the image data for each print head is resized to match the physical nozzle alignment for each print head. This can be accomplished by measuring fiducial marks which are printed by known nozzles and then scaling the scanned data to match the spacing between the printed fiducials. Following the scaling the original optical density values for each candidate of the color values can be estimated using the calibration module 216 to retrieve the identified tint transition index values for various colors in the process element 405. These values may be used to generate a mean of the optical density values for the color value tints, in the process element 406. That is, a mean optical density may be generated for each tint based on the estimated original optical densities of the tints from the sum of the original optical densities divided by the sum by the number of values. The extent of deviations of the mean OD values from the mean of this data set is directly proportional to the severity of the non-uniformity. More specifically, regions comprising small deviations in the data from the mean across the web can be construed as regions with relatively good uniformity, while regions comprising abnormally large deviations in the data from the mean across the web can be construed as regions with relatively bad uniformity. The aforementioned non-uniformity detection procedure provides data at the single nozzle level. Consequently, the mean optical densities of the tints provides a subjective basis for determining the irregularities in various color values of the printed sheet image 120, in the process element 407, and is subsequently used in compensating/adjusting the print array structure (e.g., the print heads). For example, variations from the mean optical densities may demonstrate adjustments that may be made during the halftoning process to calibrate the printing system 130 to compensate for print array artifacts.

Figure 5:
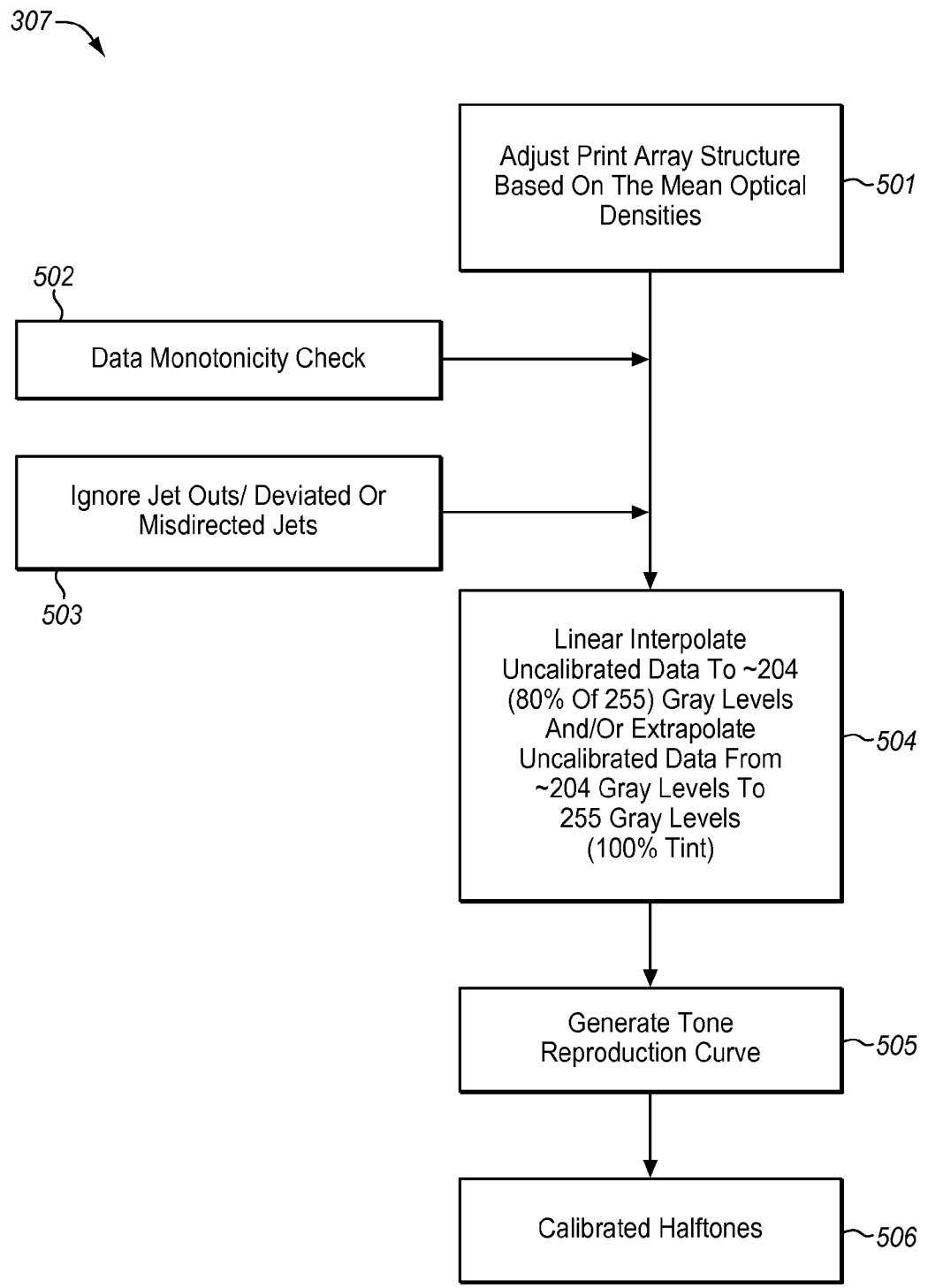
FIG. 5 is a flow chart illustrating one exemplary process of compensating the print irregularities to calibrate the printing system.

FIG. 5 is a flow chart illustrating one exemplary process 307 of compensating the print irregularities for use in calibrating the print engine 160. As mentioned, the mean optical densities of the tints may be used to adjust the print array structure. In this regard, the calibration module 216 may adjust nozzles of print heads on a per nozzle basis according to the mean optical densities to apply ink in a more uniform/ desirable fashion, in the process element 501. In doing so, the calibration module 216 may perform a data monotonicity check in the process element 502 to determine whether the data is monotonic, which is the mean optical density increases with increasing gray levels. The calibration module 216 may also ignore jet outs and/or deviated/misdirected jets, in the process element 503. For example, jet outs result from mechanical failures of nozzles. When a nozzle is completely blocked or clogged it is unable to jet ink and results in a negative spike in the mean optical density. A deviated/misdirected jet generally occurs when a nozzle is partially clogged or blocked and results in jetting ink at an angle. The deviated/ misdirected jet generally causes a negative spike occurring before or after a positive spike in the mean optical density. The calibration module 216 compensates for these jet malfunctions by replacing the data of the sheet image with the mean optical density calculated from a neighboring nozzle. Since these types of jetting failures are transient, this ensures that a reasonable value is used for this nozzle in the event that the nozzle begins to operate again.

The calibration module may then linearly interpolate uncalibrated data and/or extrapolate the data as required to generate 256 gray levels from measured gray levels in the printed sheet image 120, in the process element 504. For example, the calibration module 216 may linearly interpolate uncalibrated data to about 204 gray levels of the 255 gray levels in the image data of the printed sheet image 120 (e.g., roughly 80% tint). The calibration module 216 may extrapolate the uncalibrated data from the roughly 204 gray levels to 255 gray levels (i.e., a 100% tint). The calibration module 216 may transform the uncalibrated data to data with a defined target appearance, such as linear or sigmoidal. For overlapping nozzles, the calibration module 216 may determine a calibrated transfer function for each of the printheads in the print engine 160 based on a combined measurement function. For example, the calibration module 216 may relate the calibrated transfer function to image gray level values with the calibrated gray scale levels to be applied to a printhead. The calibration module 216 may then generate a desired intensity when the printhead is operated in a multi-pass mode of printing. Examples of such are shown and described in the cross-referenced U.S. patent application Ser. No. 12/640,692.

Figure 6:
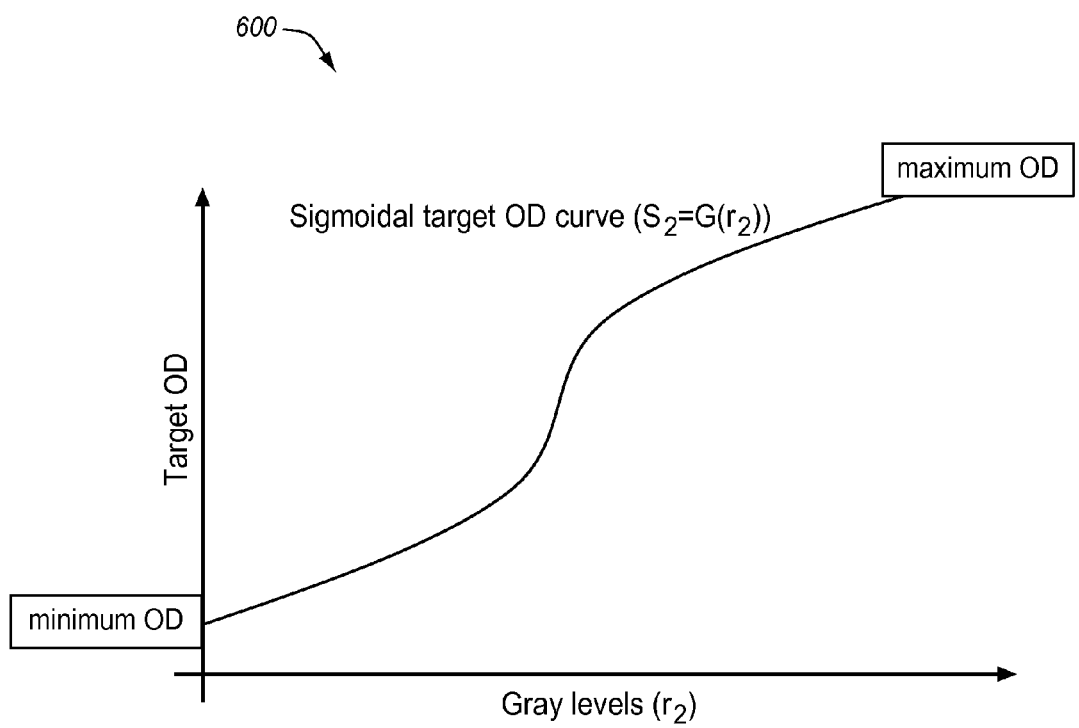
FIG. 6 is a graph of an exemplary sigmoidal target optical density curve for generating calibrated halftone screens.

With the uncalibrated data interpolated and/or extrapolated, the calibration module 216 may generate a target optical density curve, in the process element 505, as shown and described in FIG. 6. For example, the calibration module 216 may generate a sigmoidal shaped target OD curve 600 as it generally facilitates perceptually pleasing results with respect to the HVS. In doing so, the calibration module 216 may determine the following relationship between Gray levels (G) and Optical Density (OD):

Equations 17 and 18

$$\text{target\_OD} = \text{minimum\_OD} + \left\{ \left(\frac{G}{128}\right)^n * \frac{(\text{maximum\_OD} - \text{minimum\_OD})}{2} \right\};$$
$$0 \le G < 128$$

$$\text{target\_OD} = \text{maximum\_OD} + \left\{ \left(\frac{255 - G}{127}\right)^n * \frac{(\text{maximum\_OD} - \text{minimum\_OD})}{2} \right\};$$
$$128 \le G < 255$$

where n is the exponential factor of the target OD curve chosen as 1.2 for a sigmoidal target. The variables 'minimum_OD' and 'maximum_OD' are the minimum and maximum optical density values derived from measured optical density data across the paper web. Based on the target OD curve 600, the calibration module 216 generates a Transfer Function on a per nozzle basis that maps the gray levels associated with measured OD curve/values (i.e., depicting non-uniformities) to gray levels associated with a sigmoidal shaped target OD curve/values in a non-linear manner If $S_1 = T(r_1)$ is the measured OD curve and if $S_2 = G(r_2)$ is the desired/target OD curve, the TF that maps $S_1$ to $S_2$ is given as:

$$TF_{S_1 \to S_2} \Rightarrow T(r_1) = G(r_2) \Rightarrow r_1 = T^{-1}(G(r_2)) \qquad \text{Equation 19}$$

Here $r_1$ and $r_2$ are the set of corresponding/mapped gray levels before and after the calibration process. Subsequently, the calibration module 216 may generate calibrated halftones, in the process element 507, that adjust printing of the print engine 160.

Figure 7:
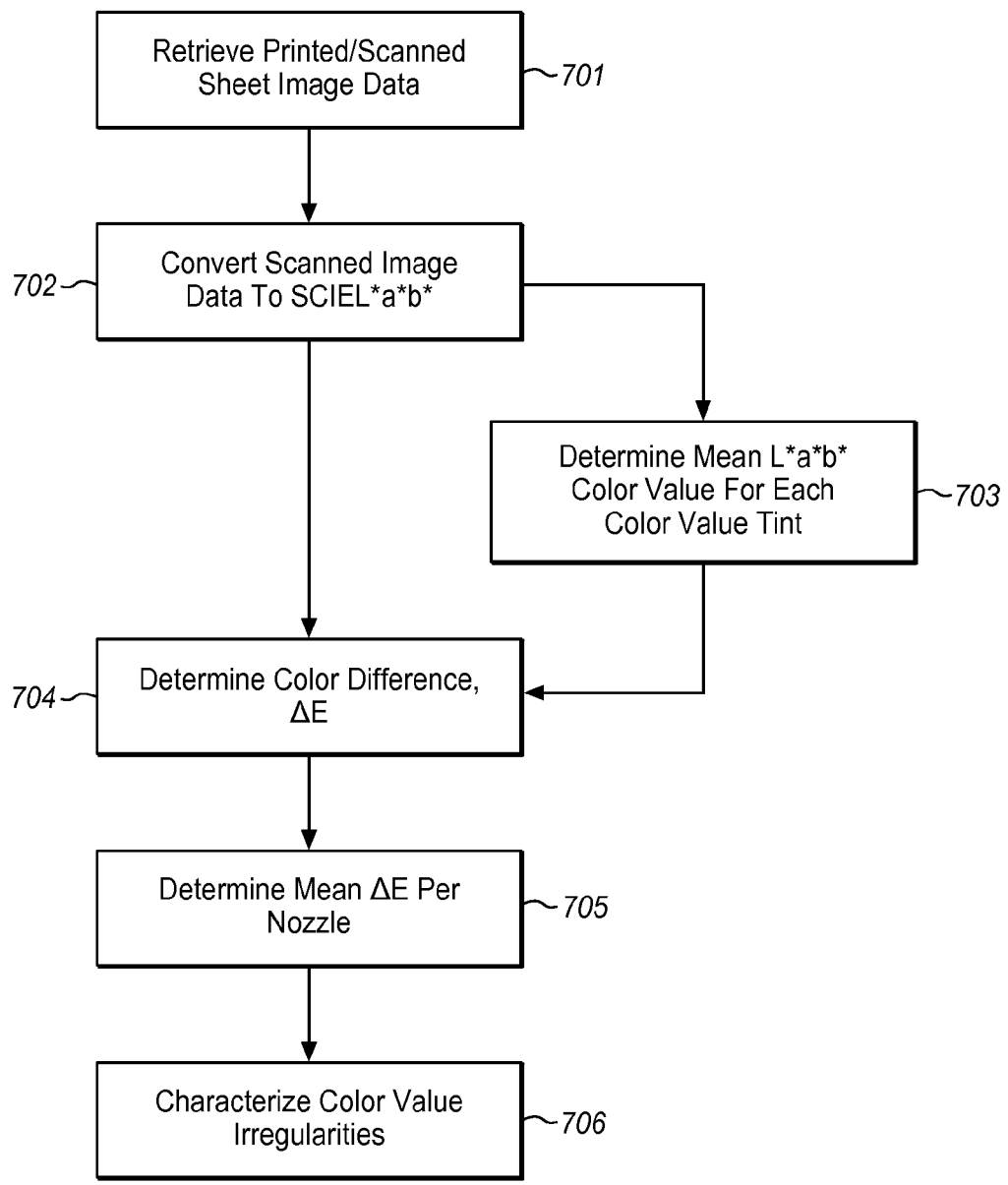
FIG. 7 is a flow chart illustrating one exemplary process of perceptually characterizing print irregularities.

FIG. 7 is a flow chart illustrating one exemplary process 305 of perceptually characterizing print irregularities. The functionality of this process may be used to characterize different non-uniformities in terms of color differences from a perceptual stand point. In this embodiment, the calibration module 216 retrieves the image data associated with the printed/scanned sheet image 120, in the process element 701 and then converts that image data to SCIEL*a*b* (Spatial CIEL*a*b*), in the process element 702. SCIEL*a*b* is a color space that was specifically designed as a spatial extension of the CIEL*a*b* color difference space. The objective of SCIEL*a*b* is to produce a metric capable of predicting the magnitude of perceived differences between two images. The spatial extension is essentially a vision-based preprocessing step on top of traditional CIEL*a*b* colorimetry and can be thought of as a spatial vision enhancement to a color difference equation.

Thereafter, the calibration module 216 may determine a mean L*a*b* color value for each color value tint of each printhead, in the process element 703. The calibration module 216 may then subtract the color converted SCIEL*a*b* image data for each print head from the mean L*a*b* color value per tint per print head to determine a ΔE color difference image, in the process element 705. The calibration module 216 may then compute the mean of the color difference along each nozzle to determine at the mean ΔE per nozzle per tint. After the mean ΔE per nozzle per tint is determined, the calibration module 216 may determine perceivable print artifacts/irregularities and characterize them as jetouts, deviated jets, overlapped jets, etc., in the process element 706. Color ΔE per nozzle differences may be determined using a variety of color difference models such as Delta E 2000 or Delta E 1976.

Figure 8:
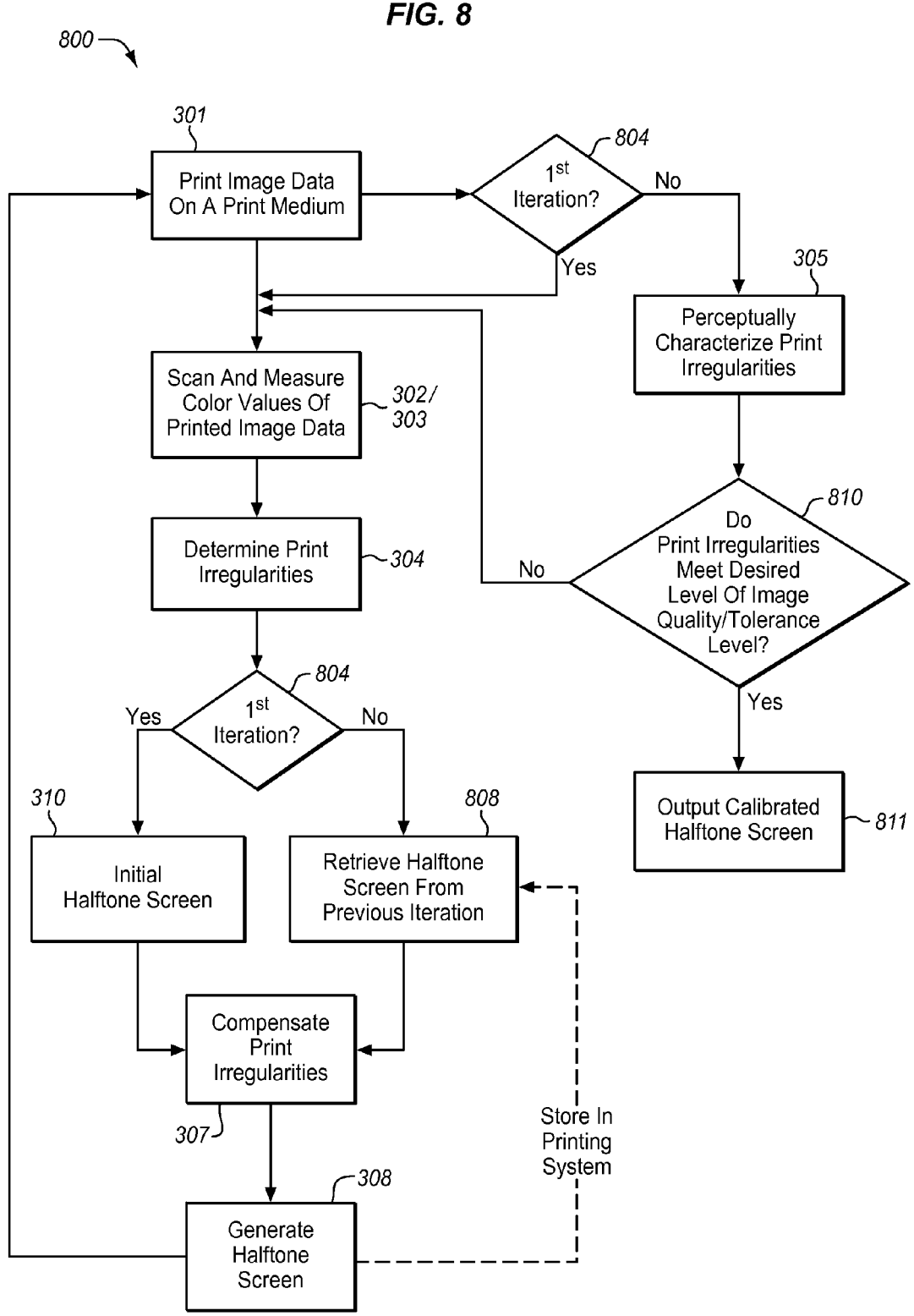
FIG. 8 is a flow chart illustrating a multi-cycle process of printer calibration in an exemplary embodiment.

FIG. 8 is a flow chart illustrating a multi-cycle process 800 of printer calibration in an exemplary embodiment. The process 800 comprises many of the same elements disclosed in the process 300 of FIG. 3. Differing from the process 300 is the capability of the process 800 to refine the calibration of the print array structure of the print engine 160. For example, the process 800 may continually generate halftone screens until one halftone screen meets some desired level of image quality as guided by the perceptual model of the HVS. In this regard, the process 800 initiates with the process element 301 by printing image data on a print medium. The image data is then scanned such that the color values of the printed image data may be measured by the measurement module 190, in the process elements 302 and 303. Thereafter, the calibration module 216 determines the print irregularities, in the process element 304.

As the process 800 is a multi-cycle process of printer calibration, the calibration module 216 determines, in the process element 804, the iteration of the process 800. If the process 800 is in the first iteration, the calibration module 216 retrieves the initial halftone screen 310 that is stored within the printing system 130. The calibration module 216 and compensates the print irregularities, in the process element 307. If, however, the process 800 is in a subsequent iteration, the calibration module 216 may retrieve a previously generated halftone screen, in the process element 808, and compensate the print irregularities, in the process element 307, to further refine the previously generated halftone screen. In either case, the calibration module 216 generates a new halftone screen, in the process element 308, after compensating the print irregularities in the initial halftone screen 310 or the generated halftone screen of the previous iteration. The newly generated halftone screen is then stored in the printing system 130 for subsequent use (i.e., to calibrate the print engine 160 or for improvements thereto).

With halftone screen generated in the process on a 308, the calibration module 216 may reprint the image data onto the print medium 180, in the process element 301. Assuming that the calibration module 216 has determined that the process 800 is in an iteration subsequent to the first iteration (i.e., the process element 804), calibration module then perceptually characterizes for the print irregularities in the printed image data on the print medium 180, in the process element 305. From there, the calibration module 216 may determine whether the perceptual characterization of the print irregularities suitably matches the target output, in the process element 810. In other words, the calibration module 216 determines whether the printed image data as calibrated by the most recently generated halftone screen sufficiently meets a desired level of image quality. If not, the calibration module 216 returns to the process element 302/303 to subsequently generate another/improved halftone screen. Otherwise, the calibration module 216 outputs the calibrated halftone screen for use in calibrating the print engine 160, in the process element 811, thereby completing the multi-cycle calibration of the printing system 130.

Figure 9:
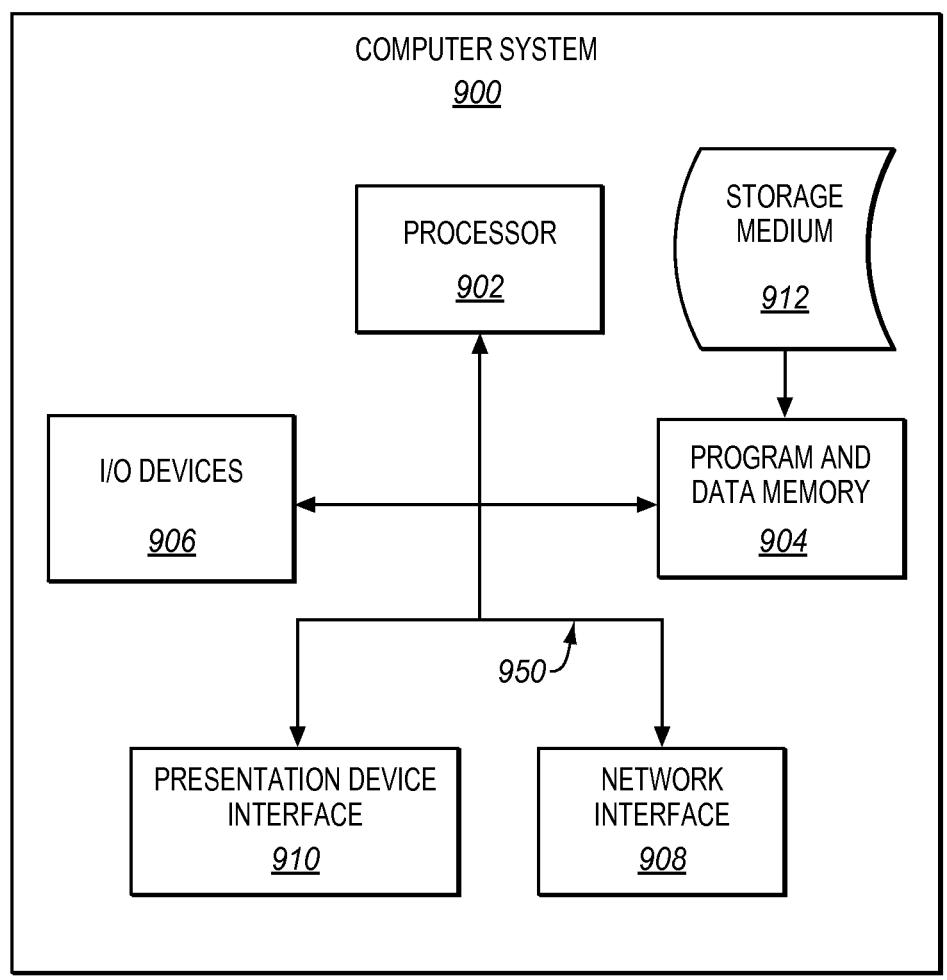
FIG. 9 illustrates a computer system operable to execute computer readable medium embodying programmed instructions to perform desired functions in an exemplary embodiment.

As mentioned, embodiments disclosed herein can take the form of software, hardware, firmware, or various combinations thereof. In one particular embodiment, software is used to direct the processor of the print controller 140 to perform the various operations disclosed herein. FIG. 9 is a block diagram depicting a computer system 900 also operable to provide the above features by executing programmed instructions and accessing data stored on a computer readable storage medium 912. In this regard, embodiments of the invention can take the form of a computer program accessible via the computer-readable medium 912 providing program code for use by a computer or any other instruction execution system. For the purposes of this description, a computer readable medium 912 can be anything that can contain, store, communicate, or transport the program for use by the computer or other instruction execution system.

The computer readable medium 912 can be an electronic, magnetic, optical, electromagnetic, infrared, or semiconductor device. Examples of the computer readable medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The computer system 900, being suitable for storing and/or executing the program code, includes at least one processor 902 coupled to memory elements 904 through a system bus 950. The memory elements 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc) can be coupled to the system either directly or through intervening I/O controllers. Network adapter interfaces 908 may also be coupled to the system to enable the computer system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 910 may be coupled to the system to interface to one or more presentation devices, such as printing systems and displays for presentation of presentation data generated by processor 902.

In one embodiment, the calibration may be implemented as software instructions operable with a host system (or other computer systems) as opposed to being performed with the print controller to perform calibration. For example, software instructions may direct a processing system, such as a general purpose computer, to generate the halftone screen and transfer it to the print controller for printing via the printer. Thus, although claimed and described with respect to a print controller, such designations are merely intended to describe the general calibration that may have been traditionally performed by a print controller. Accordingly, while specific embodiments were described herein, the scope of the invention is not limited to those specific embodiments. The scope of the invention is defined by the following claims and any equivalents thereof.

We claim:

1. A method of calibrating a print engine of a printing system, the method comprising:
   printing image data on a print medium;
   scanning the printed image data;
   measuring optical densities of color values of the scanned image data
   identifying tint transition locations of the color values;
   estimating original optical densities of the identified color value tints;
   generating a mean optical density for each of the identified color value tints using the estimated original optical densities to determine print irregularities in the color values of the scanned image data;
   generating a halftone screen based on the measured optical densities and target density levels; and
   applying the generated halftone screen to the print engine to calibrate the print engine;
   wherein estimating original optical densities of the identified tints of the color values comprises:
   generating a point spread function using the color values of the scanned image data to characterize the printing system, the print medium and a scanner;
   determining optical densities of the identified tints of the color values; and
   deconvolving the determined optical densities of the identified tints of the color values using the point spread function to generate estimates of the original optical densities of the identified tints.

2. The method of claim 1, further comprising:
   determining a perceptual model of characterizing print irregularities in the color values;
   reprinting the image data on the print medium using the generated halftone screen;
   scanning the reprinted image data;
   using the perceptual model to validate the generated halftone screen; and
   determining whether the print irregularities are compensated to tolerance levels.

3. The method of claim 2, wherein determining the perceptual model of the determined print irregularities in the color values comprises:
   converting the scanned image data to a SCIEL *a*b* color space;
   determining a mean L *a *b* value of each tint of each color value;
   comparing the mean L *a*b* value of each tint of each color value to the color converted SCIEL *a*b* image data to determine color value differences; and
   characterizing the color value irregularities based on the determined color difference using a color difference model.

4. The method of claim 1, wherein generating the mean optical density for each of the identified tints of the color values comprises:
   summing the original optical densities in each identified tint; and
   dividing the sum by the number of values used in each sum, to generate the mean optical density for each of the identified tints.

5. The method of claim 1, wherein generating a halftone screen based on the mean optical densities and target density levels comprises:
   compensating the mean optical densities of the identified tints of the color values with calibrated mean optical densities of the identified tints by non linear mapping the mean optical densities of the identified tints to the calibrated mean optical densities of the identified tints.

6. The method of claim 1, further comprising applying an initial stochastic halftone screen to the print engine prior to printing the image data on the print medium.

7. A printing system, comprising:
   a print engine operable to print image data on a print medium;
   a scanner operable to scan the printed image data;
   a measurement module operable to measure color values of the scanned image data to identify tints of the color values; and
   a calibration module operable to estimate original optical densities of the identified color value tints, generate a mean optical density for each of the identified color value tints using the estimated original optical densities to determine print irregularities in the color values of the scanned image data, and generate a halftone screen based on the mean optical densities and target density levels, and apply the generated halftone screen to the print engine to calibrate the print engine;
   wherein the calibration module is further operable to generate a point spread function of the color values of the scanned image data to characterize the printing system, determine optical densities of the identified tints of the color values, and deconvolve the point spread function with the determined optical densities of the identified tints of the color values to generate estimates of the original optical densities of the identified tints.

8. The printing system of claim 7, further comprising a storage module operable to store generated halftone screen.

9. The printing system of claim 8, wherein the calibration module is further operable to determine a perceptual model for characterizing print irregularities in the color values, retrieve the generated halftone screen from the storage module, and compare the perceptual model of the determined print irregularities to a scanned reprinted image data to validate the generated halftone screen.

10. The printing system of claim 9, wherein the calibration module is further operable to convert the scanned image data to a SCIEL *a*b* color space, determine a mean L *a*b* value of each tint of each color value, compare the mean L *a*b* value of each tint of each color value to the color converted SCIEL *a*b* image data to determine color value differences using a color difference model, and characterize the color value irregularities based on the determined color difference to determine the perceptual model.

11. The printing system of claim 7, wherein the calibration module is further operable to sum the original optical densities in each identified tint and divide each sum by the number of values used in each sum to generate the mean optical density for each of the identified tints.

12. The printing system of claim 7, wherein the calibration module is further operable to compensate the mean optical densities of the identified tints of the color values with calibrated mean optical densities of the identified tints by non linear mapping the mean optical densities of the identified tints to the calibrated mean optical densities of the identified tints to generate a halftone screen based on the mean optical densities.

13. The printing system of claim 7, wherein the calibration module is further operable to apply an initial stochastic halftone screen to the print engine prior to printing the image data on the print medium.

14. A non-transitory computer readable medium operable to store software instructions for calibrating a printing system having a print array structure, wherein the software instructions are configured to direct the printing system to:
 print image data on a print medium;
 scan the printed image data;
 measure color values of the scanned image data and identify tint transition locations of the color values;
 estimate original optical densities of the identified color value tints;
 generate a mean optical density for each of the identified color value tints using the estimated original optical densities to determine print irregularities in the color values of the scanned image data;
 generate a halftone screen based on the mean optical densities; and
 apply the generated halftone screen to the print engine to calibrate the print engine;

wherein the software instructions are configured to further direct the printing system to: generate a point spread function using the color values of the scanned image data to characterize the printing system, the print medium and a scanner;
 determine optical densities of the identified tints of the color values; and
 deconvolve the determined optical densities of the identified tints of the color values using the point spread function to generate estimates of the original optical densities of the identified tints.

15. The computer readable medium of claim 14, wherein the software instructions are configured to further direct the printing system to:
 determine a perceptual model for characterizing print irregularities in the color values;
 reprint the image data on the print medium using the generated halftone screen;
 scan the reprinted image data;
 using the perceptual model to validate the generated halftone screen; and
 determining whether the print irregularities are compensated to tolerance levels.

16. The computer readable medium of claim 15, wherein the software instructions are configured to further direct the printing system to:
 convert the scanned image data to a SCIEL *a*b* color space;
 determine a mean L *a*b* value of each tint of each color value;
 compare the mean L *a*b* value of each tint of each color value to the color converted SCIEL *a*b* image data to determine color value differences; and
 characterize the color value irregularities based on the determined color difference.

17. The computer readable medium of claim 14, wherein the software instructions are configured to further direct the printing system to:
 summing the original optical densities in each identified tint; and
 dividing the sum by the number of values used in each sum to generate the mean optical density for each of the identified tints.

18. The computer readable medium of claim 14, wherein the software instructions are configured to further direct the printing system to:
 compensate the mean optical densities of the identified tints of the color values with calibrated mean optical densities of the identified tints by non linear mapping the mean optical densities of the identified tints to the calibrated mean optical densities of the identified tints.

19. The computer readable medium of claim 14, wherein the software instructions are configured to further direct the printing system to:
 apply an initial stochastic halftone screen to the print engine prior to printing the image data on the print medium.

* * * * *